United States Patent
Komaki et al.

(10) Patent No.: US 7,119,505 B2
(45) Date of Patent: Oct. 10, 2006

(54) SERVO MOTOR CONTROL SYSTEM

(75) Inventors: Kunitaka Komaki, Yamanashi (JP);
Yasuharu Aizawa, Yamanashi (JP);
Kazunari Aoyama, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/770,398

(22) Filed: Feb. 4, 2004

(65) Prior Publication Data

US 2004/0160206 A1   Aug. 19, 2004

(30) Foreign Application Priority Data

Feb. 18, 2003   (JP)   ............... 2003-039206

(51) Int. Cl.
*H02P 1/54* (2006.01)
*H02P 19/00* (2006.01)
*G05B 19/418* (2006.01)

(52) U.S. Cl. ............ 318/113; 318/580; 318/569; 318/677; 700/95; 370/452

(58) Field of Classification Search ........... 318/569, 318/560, 625, 675, 677; 700/95; 370/452
See application file for complete search history.

(56) References Cited

U.S. PATENT DOCUMENTS

| 4,835,706 | A | * | 5/1989 | Asahi .................. 700/293 |
| 5,361,260 | A | * | 11/1994 | Mito .................. 370/452 |
| 5,990,638 | A | | 11/1999 | Aoyama et al. |
| 6,147,469 | A | * | 11/2000 | Uchida et al. ............ 318/675 |
| 6,278,902 | B1 | | 8/2001 | Hashimoto et al. ........ 700/245 |
| 6,442,444 | B1 | * | 8/2002 | Matsubara et al. .......... 700/95 |
| 6,791,294 | B1 | * | 9/2004 | Kazama et al. ............ 318/677 |
| 6,806,660 | B1 | * | 10/2004 | Fujisaki et al. ............ 318/113 |
| 2002/0010520 | A1 | * | 1/2002 | Matsubara et al. .......... 700/95 |
| 2003/0184250 | A1 | * | 10/2003 | Kurokawa et al. .......... 318/560 |
| 2004/0207357 | A1 | * | 10/2004 | Aoyama et al. ............ 318/625 |

FOREIGN PATENT DOCUMENTS

| EP | 0559214 A1 | 9/1993 |
| EP | 0846993 A1 | 6/1998 |
| EP | 0874297 A1 | 10/1998 |
| EP | 1321838 A2 * | 6/2003 |
| JP | 10-13394 | 1/1998 |
| JP | 11-33960 | 2/1999 |
| JP | 2001-387047 | * 12/2001 |
| JP | 2002-149212 | 5/2002 |
| JP | 2002-244949 | 8/2002 |
| JP | 2002-330074 | 11/2002 |
| JP | 2004-152156 | 5/2004 |

OTHER PUBLICATIONS

Copy of European Search Report dated Aug. 12, 2005.
Japanese Notice of Grounds of Rejection (Office Action) dated Nov. 3, 2005.
Japanese Office Action for Application No. 2003-039206; dated Apr. 4, 2006.

* cited by examiner

*Primary Examiner*—Paul Ip
(74) *Attorney, Agent, or Firm*—Staas & Halsey LLP

(57) ABSTRACT

In a servo control system, a numerical control device and at least one servo amplifier are connected to each other with a serial bus to control a servo motor connected to the servo amplifier. In this system, data transfer systems of at least two types for the serial bus are set, and a data transfer system is selected by a parameter set in the numerical control device.

12 Claims, 4 Drawing Sheets

SERVO MOTOR CONTROL SYSTEM

BACKGROUND OF THE INVENTION

1. Field of the Invention

The present invention relates to a servo motor control system for controlling servo motors for shafts in machines such as various industrial machines, machine tools, and robots.

2. Description of the Related Art

In a servo motor control system, a numerical control device and servo amplifiers for driving and controlling servo motors are connected to each other with a serial bus, and the numerical control device exchanges data used to control the servo motors with the servo amplifiers through the serial bus. As a connection system between the numerical control device and the servo amplifiers with a serial bus, a daisy chain system achieved by an optical cable is known (for example, see Japanese Unexamined Patent Publication No. 10-13394).

When bit rates in serial communication between the numerical control device and the servo amplifiers or between the servo amplifiers are different from each other, communication between the numerical control device and the servo amplifiers or between the servo amplifiers cannot be established. A common bit rate must be used in communication between elements constituting the servo motor control system. When the servo motor control system is structured at the first, one data transfer system is employed at the same bit rate.

However, when some element (numerical control or servo amplifier) of the system breaks to exchange the broken element with a new element in use of the servo control system, bit rates may be changed to employ a different data transfer system. In particular, when a bit rate is high, an amount of data exchanged between the numerical control device and the servo amplifiers increases. For this reason, a new product tends to employ a transfer system in which a bit rate higher than a conventional bit rate is set. For this reason, when a new product is built as an element of an existing servo motor control system, bit rates are changed, the system cannot operate. This problem is frequently posed in a servo motor control system in a machine such as a machine tool having a long life.

SUMMARY OF THE INVENTION

The present invention relates to a servo motor control system in which a numerical control device and at least one servo amplifier are connected to each other with a serial bus to control a servo motor connected to the servo amplifier.

According to the first aspect of the present invention, at least two types of data transfer systems are prepared for the serial bus, and a data transfer system is selected by a parameter which has been set in the numerical control device.

The servo motor control system according to this aspect can employ the following modes:

The servo amplifier discriminates and determines a data transfer system on the basis of a frequency of signal change for a predetermined time in a received signal on the serial bus so that the servo amplifier is adaptable to a plurality of data transfer systems.

A plurality of servo motors are connected to the numerical control device with a serial bus by a daisy chain system; each servo amplifier includes means for measuring a frequency of signal change for a predetermined time in a received signal on the serial bus and discriminating a data transfer system on the basis of the measured frequency of signal change, and at least a servo amplifier except for a most downstream servo amplifier in the daisy chain system includes first and second connectors for the serial bus, discriminates a data transfer system of the serial bus in the first connector on the basis of a signal received by the first connector and the discriminating means, and determines a data transfer system of the second connector on the basis of the discrimination result so that a servo amplifier connected to an upstream or a downstream in the daisy chain system is adaptable to a plurality of data transfer systems.

Data is coded such that the frequency of signal changes per predetermined period of time set in discrimination of a transfer system is different from that in data transfer.

The serial bus employs an optical communication system, the numerical control device and the servo amplifier have optical modules, respectively, and, when transfer bit rates of at least two types are used, the optical modules regulate emission intensities of light-emitting elements according to the transfer bit rates.

According to the second aspect of the present invention, at least two types of data transfer systems are prepared for the serial bus, and the numerical control device comprises: means for changing the frequency of signal change for a predetermined time in the data on the serial bus on the basis of a data transfer system selected from the at least two data transfer systems; means for monitoring data on the serial bus received from the servo amplifier connected to the serial bus to measure the frequency of signal changes for predetermined time, and deciding, on the basis of the measured frequency, whether the data transfer system of the servo amplifier is changed into the selected data transfer system or not; and means for performing communication by the selected data transfer system when the deciding means decides that the data transfer system is changed, and changing the data transfer system again when the deciding means decides that the transfer system is not changed and then searching for a possible data transfer system.

The servo motor control system according to this aspect can employ the following modes:

The servo amplifier discriminates a data transfer system on the basis of a frequency of signal changes for a predetermined time in a received signal on the serial bus, and transmits a signal having the same frequency of the signal change as that of the received signal when it is determined that the data transfer system is adaptable to the servo amplifier, so that the servo amplifier is adaptable to a plurality of data transfer systems.

A plurality of servo amplifiers are connected to the numerical control device with a serial bus by a daisy chain system; each servo amplifier includes means for measuring a frequency of signal change for a predetermined time in a received signal on the serial bus and discriminating a data transfer system on the basis of the measured frequency of signal change, and at least a servo amplifier except for a most downstream servo amplifier in the daisy chain system includes first and second connectors for the serial bus, discriminates a data transfer system of the serial bus in the first connector on the basis of a signal received by the first connector and the discriminating means, and determines a data transfer system of the second connector on the basis of the discrimination result so that a servo amplifier connected to an upstream or a downstream in the daisy chain system is adaptable to a plurality of data transfer systems.

Data is coded such that the frequency of signal changes per predetermined period of time set in discrimination of a transfer system is different from that in data transfer.

The serial bus employs an optical communication system, the numerical control device and the servo amplifier have optical modules, respectively, and, when transfer bit rates of at least two types are used, the optical modules regulate emission intensities of light-emitting elements according to the transfer bit rates.

The present invention includes the above configurations, so that a servo motor control system which can set a data transfer system common to the elements constituting the servo motor control system can be provided.

BRIEF DESCRIPTION OF THE DRAWINGS

The above described and other objects and features of the present invention will be apparent from the following description of embodiments with reference to the accompanying drawings. Of these drawings:

FIG. 7 is a diagram for explaining transition of the number of times of change per predetermined period of time in a signal received from the servo amplifier after the system is powered on.

DESCRIPTION OF THE EMBODIMENTS

Figure 1:
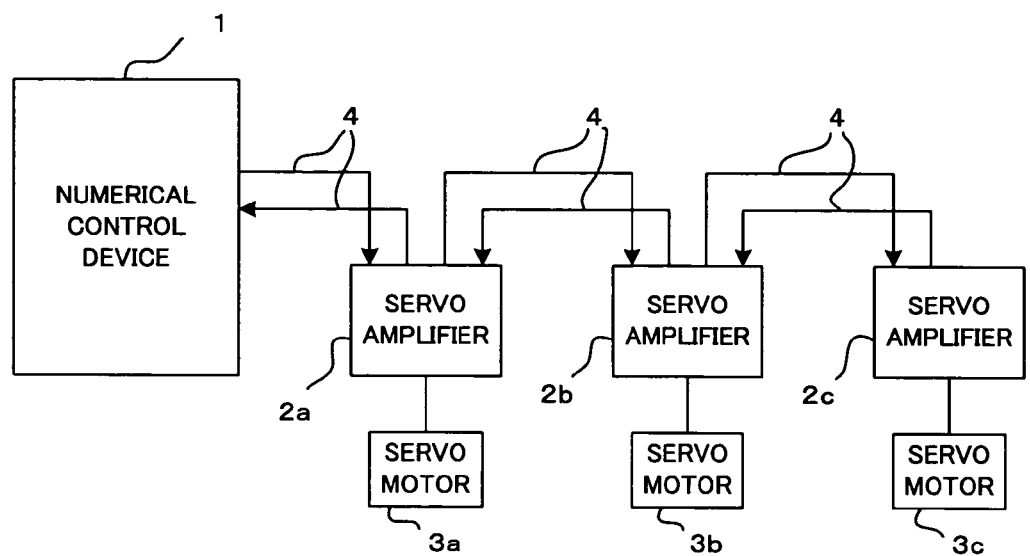
FIG. 1 is a main block diagram of an embodiment of a servo motor control system according to the present invention.

FIG. 1 shows a servo motor control system according to an embodiment of the present invention. In this embodiment, a numerical control and servo amplifiers are connected with a serial bus by a daisy chain system using an optical cable.

In this embodiment, three servo motors 3a to 3c serving as drive sources of machines such as machine tools, various industrial machines, and robots are arranged, and servo amplifiers 2a to 2c for driving and controlling the servo motors 3a to 3c are provided. A numerical control device 1 is connected to the servo amplifiers 2a to 2c by a serial bus constituted by an optical cable 4 in a daisy chain system.

The numerical control device 1 outputs a movement command or a speed command to the servo amplifiers 2a to 2c on the basis of a predetermined communication system. The servo amplifiers 2a to 2c performs position and speed loop control processes on the basis of the movement command or the speed command, using feedback signals of a position and a speed from a position/speed detector (not shown), and further performs current loop control processes and drive the servo motors 3a to 3c.

Figure 2:
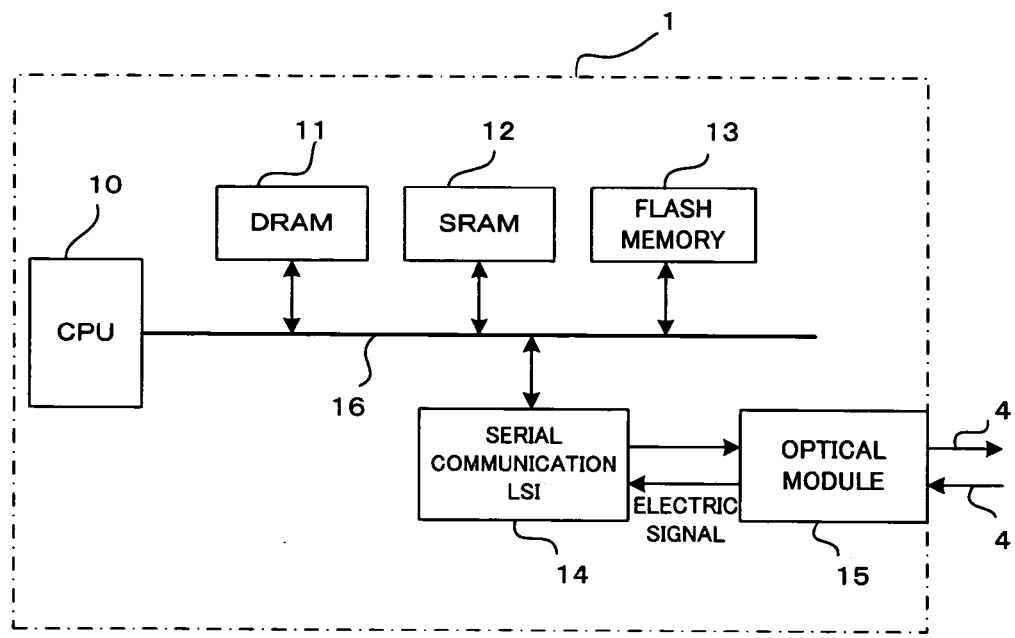
FIG. 2 is a main block diagram of a numerical control device in the servo motor control system shown in FIG. 1.

FIG. 2 is a main block diagram of the numerical control device 1. The numerical control device 1 comprises a CPU 10, a DRAM 11, an SRAM 12, a flash memory 13, and a serial communication LSI 14. The CPU 10 is formed accessible to these devices 11 to 14 via a system bus 16. The numerical control device 1 comprises an optical module 15 connected to serial communication LSI 14. The optical module 15 converts an electric signal from the serial communication LSI 14 into an optical signal and outputs the optical signal to the optical cable 4 connected to the optical module 15. Further, the optical module 15 converts the optical signal from the optical cable 4 into an electric signal and outputs the electric signal to the serial communication LSI 14.

The configuration of the numerical control device 1 is almost the same as the configuration of a conventional numerical control device, and is not different from that of the conventional numerical control device.

Figure 3:
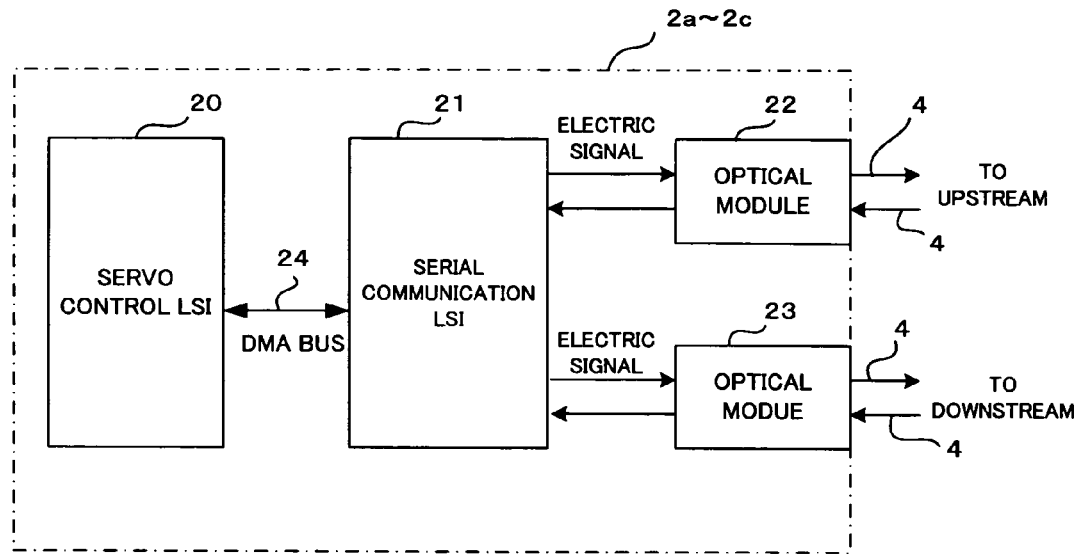
FIG. 3 is a main block diagram of a servo amplifier in the servo motor control system shown in FIG. 1.

FIG. 3 is a main schematic diagrams of servo amplifiers 2a to 2c. The servo amplifiers 2a and 2b have almost the same configurations. FIG. 3 expresses a communication system. A connection relationship between the servo amplifiers 2a to 2c and the servo motors 3a to 3c which are connected thereto is omitted in FIG. 3.

Each of the servo amplifiers 2a to 2c comprises a servo control LSI 20, a serial communication LSI 21, and upstream and downstream optical modules 22 and 23 which are used to connect the upstream and the downstream with an optical cable by a daisy chain system. Since no servo amplifier is connected to the downstream of the most downstream servo amplifier 2c, the servo amplifier 2c does not comprise the downstream optical module 23.

The servo control LSI 20 and the serial communication LSI 21 are connected to each other with a DMA (Direct Memory Access) bus 24. The optical modules 22 and 23 are connected to the optical cable 4 and also connected to the serial communication LSI 21. Like the optical module 15 described above, each of the optical modules 22 and 23 converts an electric signal from the serial communication LSI 21 into an optical signal to output the optical signal to the optical cable 4, and converts the optical signal from the optical cable 4 into an electric signal to send the electric signal to the serial communication LSI 21.

A communication between the numerical control device 1 and the servo amplifier 2a and a communication between the servo amplifiers 2a to 2c are performed through the optical cable 4. However, if a common data transfer system is not used in these communications, data transfer between the numerical control device 1 and the servo amplifiers 2a to 2c cannot be established. When a system is constructed by a new numerical control device 1 and new servo amplifiers 2a to 2c for the first time, the same data transfer system is selected without any problem. However, in the constructed system, when the numerical control device 1 or any one of the servo amplifiers 2a to 2c serving as the elements of the system is replaced, a common data transfer system is not always maintained.

Therefore, according to the present invention, a common data transfer system is realized. More specifically, in the present invention, a common data transfer system is realized by setting parameters in a numerical control device, as a first embodiment, or a numerical control device is automatically provided a common data transfer system, as a second embodiment.

First Embodiment

According to the first embodiment, a data transfer system which is set as a parameter in the numerical control device 1 in advance is used. In order to change the data transfer system, a common data transfer can be established to the numerical control device 1 and the servo amplifiers 2a to 2c by only changing the set parameter. In the first embodiment, when a system is constructed, or when the numerical control device or the servo amplifiers are partially replaced with new one, bit rates of the data transfer system which can be used by the numerical control device 1 and the servo amplifiers 2a to 2c carrying out communication are set as parameters.

When the system is powered on and reset, the serial communication LSI 14 of the numerical control device 1 transmits a signal called an idle pattern in which high and low levels alternately appear, which is the same signal as a clock signal having a frequency being ½ the lowest bit rate, to the optical cable 4 through the optical module 15. The serial communication LSI 21 of each of the servo amplifiers 2a to 2c receives this idle pattern signal from the upstream optical module 22, and, similarly, transmits the idle pattern signal to the downstream servo amplifier through the downstream optical module 23 of the optical module and the optical cable 4. The endmost servo amplifier 2c, which does not have any downstream optical module 23, transmits the idle pattern signal to the optical cable 4 through the upstream optical module 22. The numerical control device 1 receives the idle pattern signal through the servo amplifiers 2b and 2a.

When the rest signal is canceled, the CPU 10 of the numerical control device 1 loads a system program from the flash memory 13 so that the system program is developed on the DRAM 11. And the CPU 10 executes the developed system program. According to the system program, the CPU 10 sets a bit rate set as a parameter in the serial communication LSI 14. The serial communication LSI 14 sends the idle pattern, which is based on the set bit and in which high and low levels alternately appear, to the servo amplifier 2a through the optical module 15. The idle pattern based on the set bit rate is the same as the clock pattern having a frequency which is a half the set bit rate.

When the serial communication LSI 21 of the servo amplifier 2a receives the idle pattern through the upstream optical module 22, the serial communication LSI 21 monitors the idle pattern for a predetermined period time and counts the number of times of signal change to decide a bit rate. On the basis of the decision result, the bit rate is set and fixed. An idle pattern based on the set bit rate is transmitted to the downstream servo amplifier 2b of the daisy chain. In addition, the downstream servo amplifier decides a bit rate from the idle pattern the servo amplifier similarly received, sets the decided bit rate as a self bit rate, and transmits the idle pattern based on the bit rate to the downstream servo amplifier. The numerical control device 1 waits a time enough to decide bit rates of all the connected servo amplifiers, starts transmission of the data patterns, and starts communication with the servo amplifiers 2a to 2c.

The serial communication LSI 21 of each of the servo amplifiers 2a to 2c counts the number of signal changes of the idle pattern to determine a bit rate. However, as a method for counting the number, any one of a method of counting both the numbers of leading edges and trailing edges of the signal and a method of counting one of the numbers of leading edges and trailing edges of the signal may be employed.

Second Embodiment

According to the second embodiment, a common data transfer system is automatically set in a numerical control device 1 and all servo amplifiers 2a to 2c by the numerical control device 1.

When the system is powered on and reset, the serial communication LSI 14 of the numerical control device 1 transmits an idle pattern having the lowest bit rate to the servo amplifier 2a. Each servo amplifier transmits an idle pattern having the lowest bit rate to the downstream servo amplifier, and the most downstream servo amplifier 2c transmits the idle pattern to an upstream servo amplifier, and sequentially transmits the idle pattern to further upstream servo amplifiers. The numerical control device 1 receives the idle pattern having the lowest bit rate.

When the reset signal is canceled, as described above, the numerical control device 1 loads a system program from a flash memory 13 so that the system program is developed on a DRAM 11, and then executes the developed system program. The CPU 10 instructs the highest bit rate to the serial communication LSI 14. The serial communication LSI 14 sets the instructed highest bit rate and transmits the idle pattern based on the highest bit rate, which is the same as a clock pattern having a frequency which is a half the set bit rate, to the downstream servo amplifier 2a.

When the serial communication LSI 21 of the servo amplifier 2a receives the idle pattern through the upstream optical module 22 the serial communication LSI 21 counts the number of times of signal change per predetermined period of time of the idle pattern, as in the first embodiment, and decides a bit rate. When it is determined that the decided bit rate is one that can be processed by the servo amplifier 2a, that bit rate is set and fixed. Then, the idle pattern based on the set bit rate is transmitted to the downstream servo amplifiers 2b of the daisy chain. However, when it is determined that the decided bit rate is one that cannot be processed by the servo amplifier 2a, the idle pattern of the bit rate cannot be transmitted. For this reason, the idle pattern of the lowest bit rate, which has been transmitted till now, is transmitted to a downstream servo amplifier.

Similarly, each servo amplifier decides whether the bit rate of the idle pattern received from the upstream side can be processed or not by the servo amplifier. If it is determined that the bit rate is one that can be processed by the servo amplifier, the servo amplifier sets the bit rate and transmits the idle pattern of the bit rate to the downstream side. If it is determined that the bit rate is one that can not be processed by the servo amplifier, the idle pattern of the lowest bit rate is output to the downstream servo amplifier.

Similarly, the servo amplifier 2c decides whether the bit rate of the received idle pattern can be processed by the servo amplifier 2c or not. If it is determined that the bit rate is one that can be processed by the servo amplifier 2c, the servo amplifier 2c sets the bit rate and transmits the idle pattern of the bit rate to the upstream side. If it is determined that the bit rate is one that cannot be processed by the servo amplifier 2c, the servo amplifier 2c transmits an idle pattern of the lowest bit rate to the upstream servo amplifier 2b. Subsequently, as in the case of the first embodiment, the idle pattern transmitted from the most downstream servo amplifier 2c is transmitted to the numerical control device 1, going upstream through the servo amplifiers connected by the daisy chain system.

As a result, if any one of the servo amplifiers 2a to 2c connected to each other by the daisy chain system is adaptable to the highest bit rate, the numerical control device 1 can receive only an idle pattern of the lowest bit rate. If all the servo amplifiers 2a to 2c connected to each other by the daisy chain system is adaptable to the highest bit rate, the numerical control device 1 can receive the idle pattern of the highest bit rate.

When he numerical control device 1 transmits an idle pattern based on the highest bit rate and receives the idle pattern of the highest bit rate, the numerical control device 1 starts transmission and reception of data at the set highest bit rate on the assumption that the highest bit rate is set for all the servo amplifiers connected by the daisy chain system.

On the other hand, the numerical control device 1 transmits an idle pattern based on the highest bit rate. After a set predetermined period of time has elapsed, if the numerical control device 1 cannot receive the idle pattern based on the highest bit rate, then the numerical control device 1 determines that the servo amplifiers 2a to 2c include a servo amplifier which is adaptable to the highest bit rate. The numerical control device 1 sets the next highest bit rate in the serial communication LSI 14 and transmits an idle pattern based on the bit rate. Each of the servo amplifiers 2a to 2c, as in the above description, decides a bit rate on the basis of the number of times of signal change of the idle pattern. When the bit rate is one that can be processed by the servo amplifier, the bit rate is set and the idle pattern having that bit rate is sent to a downstream servo amplifier. When the bit rate is one that cannot be processed by the servo amplifier, the idle pattern of the lowest bit rate is sent to the downstream side. When it is determined that the bit rate is one that can be processed by the most downstream servo amplifier 2c, the bit rate is set and the idle pattern having that bit rate is sent to the upstream servo amplifier, with the result that this idle pattern is sent to the numerical control device in the same way as described above.

When the numerical control device 1 receives the same idle pattern as the transmitted idle pattern, the numerical control device 1, considering that the bit rate corresponding to the transmitted idle pattern has been fixed and set, starts transmission and reception of data at the bit rate. After the set predetermined period of time has elapsed, the numerical control device 1 cannot receive the same idle pattern as the transmitted idle pattern and can receive only the idle pattern having the lowest bit rate, the numerical control device 1 sets the next lower bit rate and transmits the corresponding idle pattern.

The numerical control device 1 sequentially sets the lower bit rates until the numerical control device 1 receives the same idle pattern as the transmitted idle pattern, and transmits the idle pattern corresponding to the bit rate. When the numerical control device 1 can receive the same idle pattern as the transmitted idle pattern, the numerical control device 1, considering that a common data transfer system is established between devices connected to each other by the daisy chain system for the bit rate corresponding to the idle pattern, starts transmission and reception of data at the bit rate.

Figure 4:
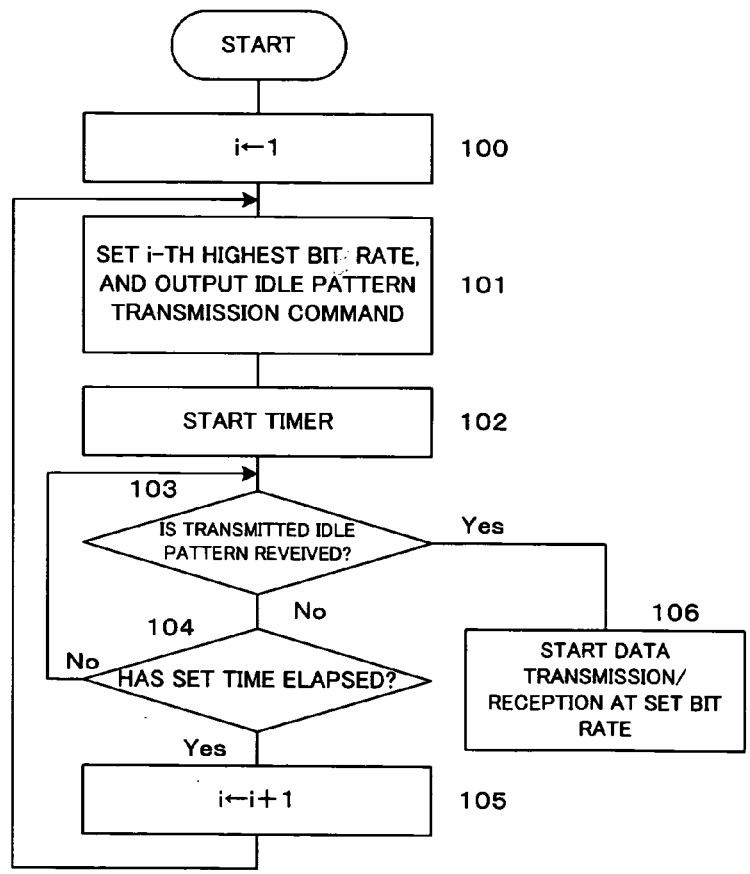
FIG. 4 is a flow chart of a bit rate automatic selection process performed by the numerical control device in the servo motor control system shown in FIG. 1.

FIG. 4 is a flow chart of a bit rate automatic selection process performed by the CPU 10 of the numerical control device 1.

The CPU 10 sets an index i to "1" (step 100), and sets the i-th highest bit rate indicated by the value of the index i in the serial communication LSI 14, and commands the serial communication LSI 14 to send the idle pattern corresponding to the bit rate (step 101). The CPU 10 starts the timer (step 102). The serial communication LSI 14 transmits the idle pattern corresponding to the set bit rate to the servo amplifier 2a through the optical module 15 and the optical cable 4 as described above.

The CPU 10 decides whether the transmitted idle pattern can be returned and received (step 103). When the CPU 10 cannot receive the idle pattern, the CPU 10 decides whether the timer measures the set elapsed time or not (step 104). When the set time has elapsed without receiving the transmitted idle pattern, the index i is incremented by "1" (step 105). The processing returns to step 101, and the CPU 10 sets the i-th bit rate indicated by the value of the index i to instruct to send the corresponding idle pattern.

Until the transmitted idle pattern is sent back and received, the above process is repeatedly executed while incrementing the index i. When the transmitted idle pattern is received, a current bit rate is set for the devices (the numerical control device 1 and the servo amplifiers 2a to 2c) connected to each other by the daisy chain system, and data transmission/reception based on the common bit rare can be performed. Accordingly, the data transmission/reception at the bit rate is started (step 106).

Figure 5:
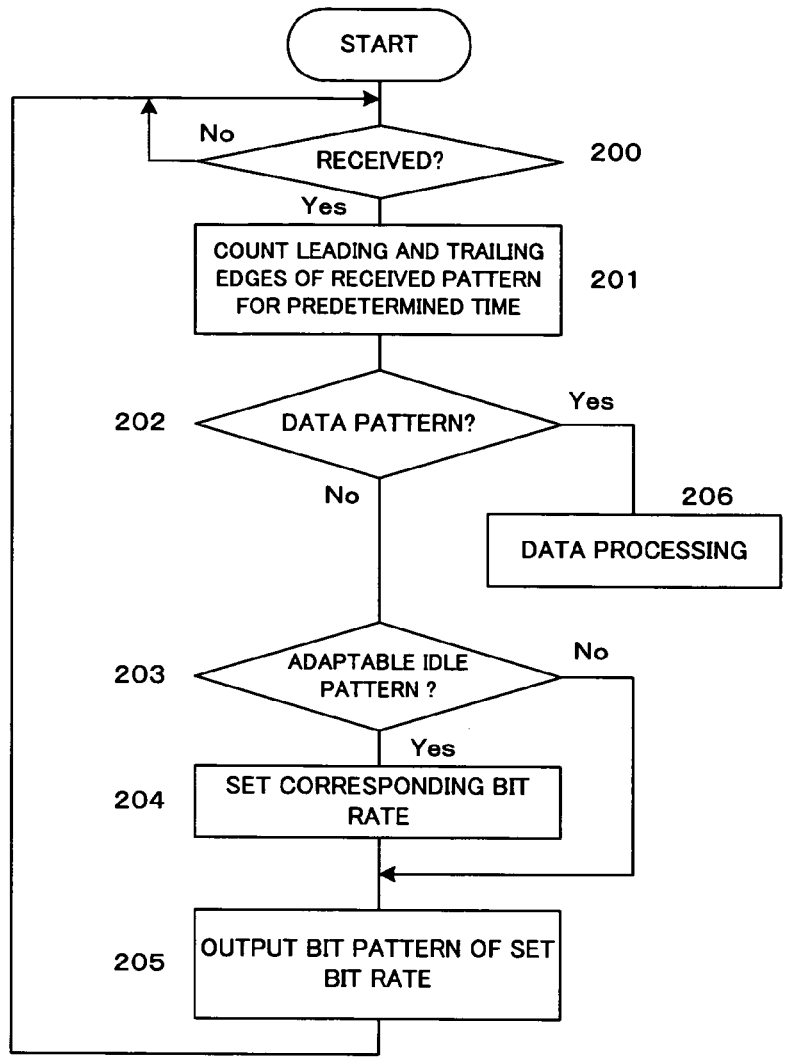
FIG. 5 is a flow chart of a bit rate automatic selection process performed by a servo amplifier in the servo motor control system shown in FIG. 1.

FIG. 5 is processes executed by the serial communication LSI 21 of each of the servo amplifiers 2a to 2c.

The serial communication LSI 21 decides whether a signal such as data is received from the upstream side (step 200). When the signal is received, the serial communication LSI 21 counts leading and trailing edges of the received pattern for a predetermined period of time (step 201). On the basis of the counted value, the serial communication LSI 21 decides whether the pattern is a data pattern based on the set bit rate or not (step 202). When the pattern is not a data pattern, the serial communication LSI 21 decides, on the basis of the counted value, whether the pattern is an idle pattern of a bit rate which can be processed or not (step 203).

When the serial communication LSI 21 determined that the bit rate can be processed, the bit rate is set in the serial communication LSI 21 (step 204). When the serial communication LSI 21 determines that the bit rate cannot be processed, the serial communication LSI 21 does not set the bit rate, holds the lowest bit rate, and the processing proceeds to step 205. The serial communication LSI 21 transmits the idle pattern corresponding to the set bit rate to the downstream servo amplifier (the most downstream servo amplifier 2c transmits the idle pattern to the upstream servo amplifier) (step 205).

The processing returns to step 200 and the serial communication LSI 21 repeatedly executes the processes in step 200 and subsequent steps. Furthermore, when it is determined that the data pattern is received in step 202, data processing is started (step 206).

As described above, the idle pattern is set such that the number of times of signal change for a predetermined period of time is larger than that of the data pattern. However, if the number of times of signal change of a data pattern having a high bit rate is close to the number of times of signal change of an idle pattern having a low bit rate, an erroneous decision may be made. In such a case, as shown in FIG. 6, a redundant bit is inserted into the data pattern to increase the number of times of signal change of the data pattern, so that the erroneous decision is prevented from being made.

Figure 6:
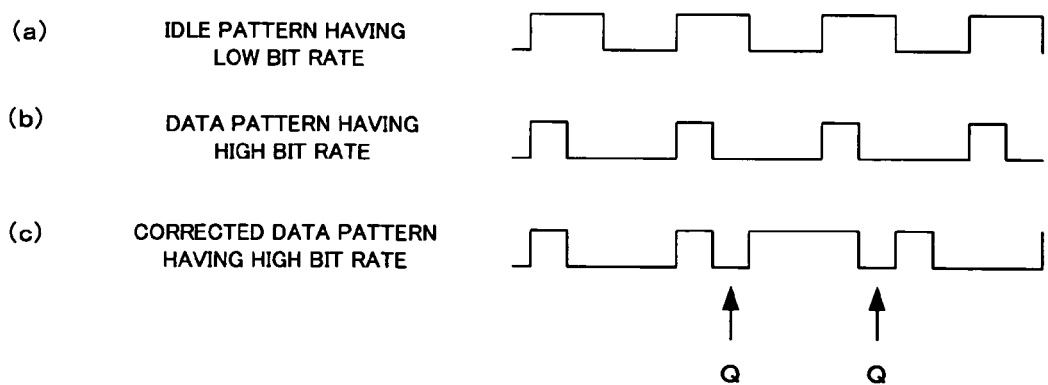
FIG. 6 is a diagram for explaining a method of preventing an erroneous decision of an idle pattern of a low bit rate and a data pattern of a high bit rate.

In FIG. 6, (a) shows an idle pattern having a low bit rate, (b) shows a data pattern having a high bit rate which is close to the low bit rate of the idle pattern (a), and (c) shows a data pattern obtained by inserting a redundant bit Q into the data pattern (b) having the high bit rate.

Figure 7:
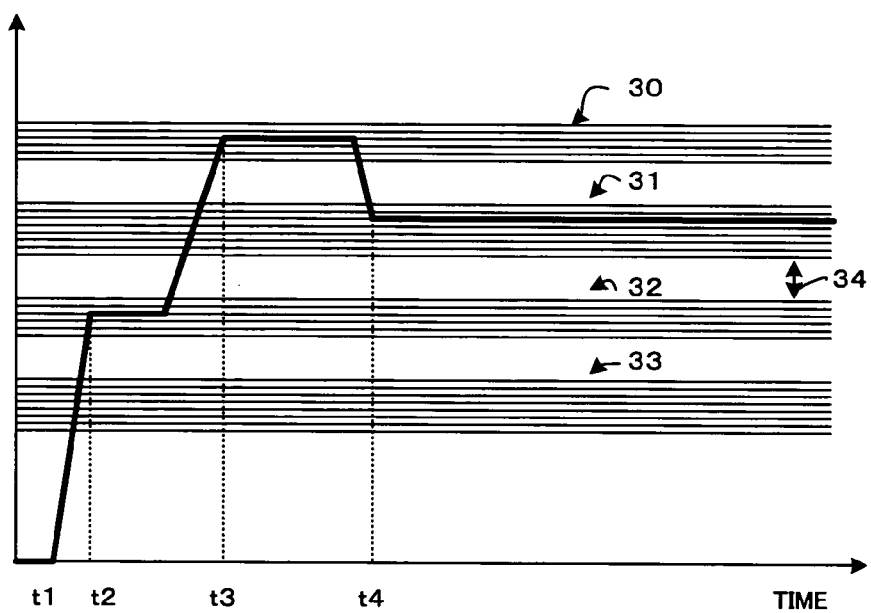

FIG. 7 is a diagram explaining transition of the number of times of change for predetermined period of time of a received signal from the time when the system is powered on. In FIG. 7, it is assumed that there are only two types of bit rates, high rate and low rate. In FIG. 7, reference numeral 30 denotes a range of the number of times of signal change of an idle pattern having a high bit rate, reference numeral 31 denotes a range of the number of times of signal change of a data pattern having a high bit rate, reference numeral 32 denotes a range of the number of times of signal change of an idle pattern having a low bit rate, and reference numeral 33 denotes a range of the number of times of signal change of a data pattern having a low bit rate. As indicated by an arrow 34, the difference between the number of times of signal change of the idle pattern having the low bit rate (range indicated by reference numeral 32) and the number of times of signal change of the data pattern having the high bit rate (range indicated by reference numeral 31) explained in FIG. 6 can be apparently discriminated by inserting the redundant bit Q into the data pattern of the high bit rate.

When the system is powered on at time t1, an idle pattern having a low bit rate is sent (time t2). When the reset state is canceled, an idle pattern having a high bit rate is transmitted (time t3). In FIG. 7, it is determined that data transmission/reception at the high bit rate is possible (time t4), and data transmission/reception is started at the high bit rate.

Figure 8:
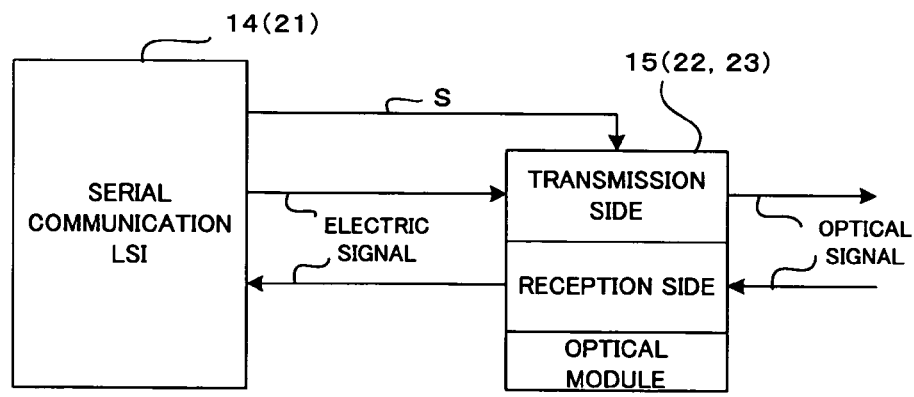
FIG. 8 is a diagram for explaining regulation of an optical intensity by a bit rate in the first embodiment of the servo motor control system according to the present invention.

In case where an optical signal is received by an optical module, an optical intensity must be increased if the bit rate is high, depending on the circuit on the reception side. However, when the bit rate is low, if an optical signal having the same optical intensity is received, an electric signal output from the optical module may be distorted. If this distortion is large, the reception of data may be impossible. Thus, as shown in FIG. 8, a signal S representing a bit rate at which data is output from the optical module is transmitted from the serial communication LSI 14 (21) of each of the numerical control device 1 and the servo amplifiers 2a to 2c to the optical module 15 (22, 23) is increased. When the bit rate is high, the emission intensity of a light-emitting element of the optical module 15 (22, 23). When the bit rate is low, the emission intensity is decreased. In this way, the electric signal is prevented from being easily distorted even if the bit rate changes.

In the above embodiment, the numerical control device and the servo amplifiers are connected to each other with the serial bus by a daisy chain system. However, the present invention can also be applied to a case in which the servo amplifiers are connected to the numerical control device with the serial bus, not using a daisy chain system. In this case, when a bit rate is set as a parameter, a bit rate which can be processed in common may be set in the numerical control device as in the case of the above embodiment. When automatic selection is used, for example, idle patterns corresponding to higher bit rates are transmitted to the servo amplifiers in a descending order of bit rates. Then it is decided whether the same idle patterns are sent back from all the idle patterns or not, and if the same idle pattern is sent back, it is determined that corresponding bit rate is set for each of the servo amplifiers. Thus, data transfer is performed at this bit rate.

On the other hand, if the same idle pattern is not sent back from any one of the servo amplifiers (or when only an idle pattern having the lowest bit rate can be received in a set predetermined time after an idle pattern is transmitted), it means that the is a servo amplifier which is not adaptable to the bit rate, so that an idle pattern having the next lower bit rate is transmitted. Subsequently, until the idle patterns which have been sent out are sent back from all the servo amplifiers within a set predetermined period of time, idle patterns having bit rates lowered successively are transmitted. When the idle patterns sent from all the servo amplifiers are received, the numerical control device and the servo amplifiers are set at the corresponding bit rate. Thus, from this time, data transmission/reception at the bit rate is started.

According to the present invention, as described above, a plurality of data transfer systems can selectively be set in a numerical control device and servo amplifiers which are connected to each other with a serial bus. Accordingly, in a system constituted by a numerical control device and servo amplifiers, even though any one of the numerical control device and the servo amplifiers serving as constituent elements of the system is replaced with a new one, a common data transfer system can be selectively set for all the constituent elements. Therefore, even though old products and new products are mixed in the system, the old system can easily be maintained. In particular, in a machine system such as a machine tool or an industrial machine which is continuously used for many years, the constituent elements such as servo motors or a numerical control device constituting the system are modified to be adaptable to a high-speed data transfer system. Even in this case, when the new product is replaced with a constituent element of the system, data transmission/reception can be performed, and the system can be maintained.

The invention claimed is:

1. A servo motor control system in which a numerical control device and at least one servo amplifier are connected to each other with a serial bus to control a servo motor connected to the servo amplifier, wherein:
    at least two types of data transfer systems are prepared for the serial bus,
    a data transfer system is selected by a parameter which has been set in the numerical control device;
    a plurality of servo motors are connected to the numerical control device with a serial bus by a daisy chain system,
    each servo amplifier includes means for measuring a frequency of signal change for a predetermined time in a received signal on the serial bus and discriminating a data transfer system on the basis of the measured frequency of signal change, and
    at least a servo amplifier except for a most downstream servo amplifier in the daisy chain system includes first and second connectors for the serial bus, discriminates a data transfer system of the serial bus in the first connector on the basis of a signal received by the first connector and said discriminating means, and determines a data transfer system of the second connector on the basis of the discrimination result so that a servo amplifier connected to an upstream or a downstream in the daisy chain system is adaptable to a plurality of data transfer systems.

2. A servo motor control system in which a numerical control device and at least one servo amplifier are connected to each other with a serial bus to control servo motors connected to the servo amplifier, wherein
    at least two types of data transfer systems are prepared for the serial bus, and said numerical control device comprises:
    means for changing the frequency of signal change for a predetermined time in the data on the serial bus on the basis of a data transfer system selected from the at least two data transfer systems;
    means for monitoring data on the serial bus received from the servo amplifier connected to the serial bus to measure the frequency of signal changes for predetermined time, and deciding, on the basis of the measured frequency, whether the data transfer system of the servo amplifier is changed into the selected data transfer system or not; and means for performing communication by the selected data transfer system when said deciding means decides that the data transfer system is changed, and changing the data transfer system again when said deciding means decides that the transfer system is not changed and then searching for a possible data transfer system.

3. The servo motor control system according to claim 2, wherein the servo amplifier discriminates a data transfer system on the basis of a frequency of signal changes for a predetermined time in a received signal on the serial bus, and transmits a signal having the same frequency of the signal change as that of the received signal when it is determined that the data transfer system is adaptable to the servo amplifier, so that the servo amplifier is adaptable to a plurality of data transfer systems.

4. The servo motor control system according claim 2, wherein data is coded such that the frequency of signal changes per predetermined period of time set in discrimination of a transfer system is different from that in data transfer.

5. The servo motor control system according to claim 2, wherein the serial bus employs an optical communication system, the numerical control device and the servo amplifier have optical modules, respectively, and, when transfer bit rates of at least two types are used, the optical modules regulate emission intensities of light-emitting elements according to the transfer bit rates.

6. The servo motor control system according to claim 3, wherein
   a plurality of servo amplifiers are connected to the numerical control device with a serial bus by a daisy chain system,
   each servo amplifier includes means for measuring a frequency of signal change for a predetermined time in a received signal on the serial bus and discriminating a data transfer system on the basis of the measured frequency of signal change, and
   at least a servo amplifier except for a most downstream servo amplifier in the daisy chain system includes first and second connectors for the serial bus, discriminates a data transfer system of the serial bus in the first connector on the basis of a signal received by the first connector and said discriminating means, and determines a data transfer system of the second connector on the basis of the discrimination result so that a servo amplifier connected to an upstream or a downstream in the daisy chain system is adaptable to a plurality of data transfer systems.

7. The servo motor control system according claim 3, wherein data is coded such that the frequency of signal changes per predetermined period of time set in discrimination of a transfer system is different from that in data transfer.

8. The servo motor control system according to claim 3, wherein the serial bus employs an optical communication system, the numerical control device and the servo amplifier have optical modules, respectively, and, when transfer bit rates of at least two types are used, the optical modules regulate emission intensities of light-emitting elements according to the transfer bit rates.

9. The servo motor control system according to claim 6, wherein data is coded such that the frequency of signal changes per predetermined period of time set in discrimination of a transfer system is different from that in data transfer.

10. The servo motor control system according to claim 6, wherein the serial bus employs an optical communication system, the numerical control device and the servo amplifier have optical modules, respectively, and, when transfer bit rates of at least two types are used, the optical modules regulate emission intensities of light-emitting elements according to the transfer bit rates.

11. A servo motor control system in which a numerical control device and at least one servo amplifier are connected to each other with a serial bus to control a servo motor connected to the servo amplifier, wherein:
   at least two types of data transfer systems are prepared for the serial bus,
   a data transfer system is selected by a parameter which has been set in the numerical control device;
   a plurality of servo motors are connected to the numerical control device with a serial bus by a daisy chain system,
   each servo amplifier includes means for measuring a frequency of signal change for a predetermined time in a received signal on the serial bus and discriminating a data transfer system on the basis of the measured frequency of signal change,
   at least a servo amplifier except for a most downstream servo amplifier in the daisy chain system includes first and second connectors for the serial bus, discriminates a data transfer system of the serial bus in the first connector on the basis of a signal received by the first connector and said discriminating means, and determines a data transfer system of the second connector on the basis of the discrimination result so that a servo amplifier connected to an upstream or a downstream in the daisy chain system is adaptable to a plurality of data transfer systems, and
   data is coded such that the frequency of signal changes per predetermined period of time set in discrimination of the transfer system is different from that in data transfer.

12. A servo motor control system in which a numerical control device and at least one servo amplifier are connected to each other with a serial bus to control a servo motor connected to the servo amplifier, wherein:
   at least two types of data transfer systems are prepared for the serial bus,
   a data transfer system is selected by a parameter which has been set in the numerical control device;
   a plurality of servo motors are connected to the numerical control device with a serial bus by a daisy chain system,
   each servo amplifier includes means for measuring a frequency of signal change for a predetermined time in a received signal on the serial bus and discriminating a data transfer system on the basis of the measured frequency of signal change, and
   at least a servo amplifier except for a most downstream servo amplifier in the daisy chain system includes first and second connectors for the serial bus, discriminates a data transfer system of the serial bus in the first connector on the basis of a signal received by the first connector and said discriminating means, and determines a data transfer system of the second connector on the basis of the discrimination result so that a servo amplifier connected to an upstream or a downstream in the daisy chain system is adaptable to a plurality of data transfer systems, and
   the serial bus employs an optical communication system, the numerical control device and the servo amplifier have optical modules, respectively, and, when transfer bit rates of at least two types are used, the optical modules regulate emission intensities of light-emitting elements according to the transfer bit rates.

* * * * *

UNITED STATES PATENT AND TRADEMARK OFFICE
CERTIFICATE OF CORRECTION

| | | |
|---|---|---|
| PATENT NO. | : 7,119,505 B2 | Page 1 of 1 |
| APPLICATION NO. | : 10/770398 | |
| DATED | : October 10, 2006 | |
| INVENTOR(S) | : Kunitaka Komaki et al. | |

It is certified that error appears in the above-identified patent and that said Letters Patent is hereby corrected as shown below:

On the title page item [30]:
Column 2 (Foreign Patent Documents), Line 11, below "JP 2004-152156 5/2004" insert
--JP 04-245795 9/1992
 JP 2000-049891 2/2000
 JP 09-114505 5/1997
 JP 2001-292000 10/2001 --.

Column 6, Line 35, change "amplifiers" to --amplifier--.

Signed and Sealed this

Twenty-fourth Day of April, 2007

JON W. DUDAS
*Director of the United States Patent and Trademark Office*